Dec. 1, 1953  H. C. KEMPER ET AL  2,660,932
AUTOMATIC CYCLE MACHINE TOOL
Filed Oct. 15, 1951
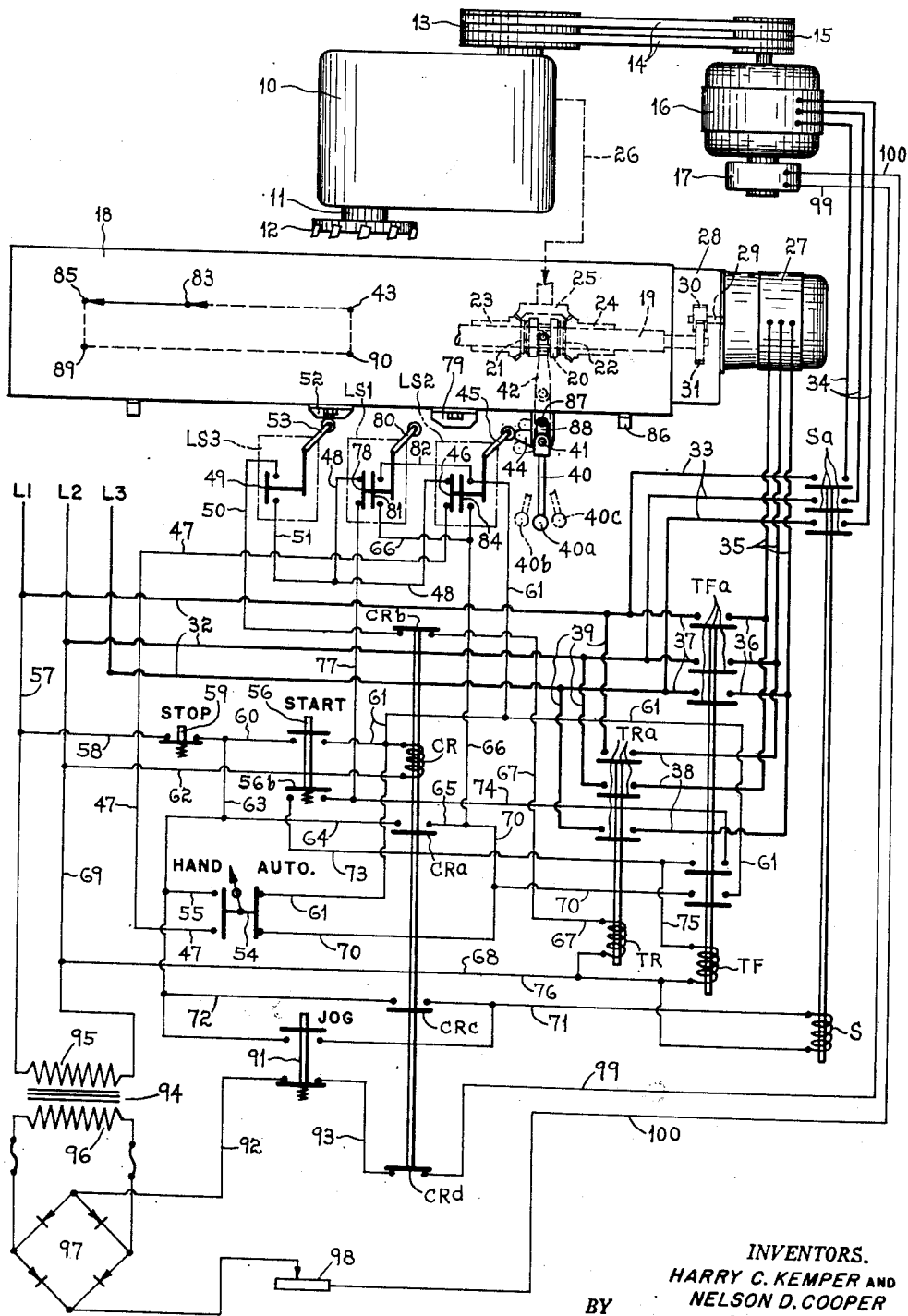
INVENTORS.
HARRY C. KEMPER AND
NELSON D. COOPER
BY Willard S. Groene
ATTORNEY.

Patented Dec. 1, 1953

2,660,932

UNITED STATES PATENT OFFICE 2,660,932

AUTOMATIC CYCLE MACHINE TOOL

Harry C. Kemper, Goshen Township, Clermont County, and Nelson D. Cooper, Mariemont, Ohio, assignors to The R. K. Le Blond Machine Tool Co., Cincinnati, Ohio, a corporation of Delaware Application October 15, 1951, Serial No. 251,402

7 Claims. (Cl. 90—21)

This invention pertains to improvements in automatic operating cycles for machine tools.

One of the objects of this invention is to provide an improved control circuit for a machine tool having relative rapid traverse and feeding movements between work and tool.

Another object of this invention is to provide an improved control and operating circuit for a machine tool for effecting rapid traverse and feeding movements between work and tool in a predetermined operating cycle.

Still another object of this invention is to provide an improved feed and rapid traverse mechanism for a machine tool which is fully automatic and fool proof in operation and yet readily adapted to manual control when desired.

Still another object of this invention is to provide an improved milling machine transmission and control mechanism for actuating the work table at feed and rapid traverse movements.

Further features and advantages of this invention will appear from a detailed description of the drawing in which the figure of the drawing shows a diagrammatic circuit layout applied to a machine tool incorporating the features of this invention.

As illustrative of one form of machine tool to which the aforementioned control circuit is especially adapted, there is illustrated a typical milling machine having the main column 10 containing the cutter spindle 11 and having a suitable milling cutter 12 mounted thereon. A suitable transmission in the column 10 for driving the spindle 11 and cutter 12 is actuated from the input drive pulley 13 connected by suitable belts 14 and the motor pulley 15 to the main spindle drive motor 16. Associated with the spindle drive motor 16 is a suitable magnetic brake 17 for quickly arresting rotation of the motor 16 when de-energized and the cutter spindle 11 and cutter 12 through the transmission mechanism in the column 10.

Mounted for the usual reciprocatory motion on the column 10 is the work table 18 which is actuated in a well known manner by the feed screw 19 which is connected to be driven in one direction or the other by a clutch spool 20 slidingly mounted relative to the screw 19 but in driving relation therewith, the clutch spool 20 having clutching means 21 and 22 adapted to engage mating clutching means on the bevel drive pinions 23 and 24, each of which pinions are driven in opposite directions by the common drive bevel gear 25 which in turn is driven as illustrated diagrammatically at 26, from the power transmission in the column 10 in a well known manner. Thus by engaging the clutch spool 20 with the bevel pinion 23 the screw 19 may be rotated in one direction to effect a forward feed movement for the work table 18, to the left as indicated in the figure of the drawing, or it may be moved in reverse feed movement by engagement of the clutch spool member 20 with the bevel pinion 24, or to the right as indicated in the diagram. The motions thus discussed are the slow feed motions for the work table during the actual engagement of the cutter 12 with a workpiece mounted on the work table 18.

It is also desirable to actuate the work table in either direction at a fast or rapid traverse motion so as to bring the work and cutter into relative operating position as promptly as possible and to also retract them from one another as fast as practicable as soon as the cutting operation has been completed so as to save unnecessary time of noncutting operations at the slow feeding speed. This is accomplished by means of a rapid traverse drive motor 27 which is mounted on the table 18 by a suitable bracket 28 and has a motor drive shaft 29 carrying a drive pinion 30 which in turn is connected to a gear 31 fixed to the feed screw 19 so that the armature of the motor 27 is at all times positively and directly connected to the feed screw 19.

Power for energizing the main drive spindle motor 16 is derived from a suitable source of three phase alternating current such as the leads L1, L2 and L3 to which are connected the leads 32 which in turn are connected through the leads 33 the contacts Sa and the leads 34 to the motor 16. The rapid traverse motor is connected to the leads 32 through the leads 35, 36, normally open forward rapid traverse power contacts TFa and leads 37, for forward actuation of the motor 27 and work table 18 at rapid traverse movement. For reverse operation of the rapid traverse motor 27 and retraction of the table 18, leads 35 are connected through leads 38 normally open reverse rapid traverse power controls contacts TRa and leads 39 to the power supply leads 32.

The clutch member 20 is actuated manually for engaging and disengaging the feed for one direction or the other of feed movement of the table 18 by the feed control lever 40 which is pivotally mounted on the column or frame structure of the milling machine in a well known manner by a suitable pivot pin 41 and has a lever arm 42 connected to the clutch spool in such a manner that when the lever 40 is moved from its neutral or stop feed position 40a to the forward feed position 40b clutch member 20 will be engaged with the bevel pinion 23 for driving feed screw 19 as described to effect forward feeding movement of the table 18. When the feed control lever 40 is moved to the feed reverse position 40c, the clutch member 20 is engaged to be driven from the bevel pinion 24 for reverse feed movement to the table 18 as described.

Operation of the machine in automatic cycle is accomplished as follows:

With the work table 18 in fully retracted or starting position, such as illustrated diagrammatically at 43 in the diagram on top of the work table 18 in the drawing, with the manual feed control lever 40 in its neutral position 40a, a lug 44 fixed to the lever 40 engages the actuating arm 45 of the first limit switch LS2 so as to hold its contact 46 closed interconnecting lead 47 with lead 48. A third limit switch LS3 has its contact 49 held open to disconnect leads 50 and 51, by means of a trip dog 52 carried on the work table 18 which engages the control arm 53 of the third limit switch LS3 at this time. In order to begin the automatic cycle the operator moves the selector switch 54 to automatic position so as to interconnect leads 55 and 47. The momentary start contact button 56 is then pressed so as to energize control relay coil CR by completing a circuit from power supply lead L1 through lead 57, 58, stop push button 59, lead 60, and the lead 61 connected to the control relay coil CR, while the other end of the coil CR is connected through the lead 62 to complete the circuit to the other lead L2 of the single phase control circuit L1—L2. Energizing the control relay coil CR causes the first normally open control relay contact CRa to close to interconnect lead 60 through lead 63 and lead 64 and the closed contact CRa to a lead 65. Lead 65 in turn is connected to lead 66 which is open at second limit switch LS1 and first limit switch LS2 at the beginning of the operating cycle. Also, at this time, first normally closed control relay contact CRb is open so as to disconnect lead 50 from lead 67 connected to the relay coil TR which in turn is connected through a lead 68 to the power supply line 69 connected to the lead L2. Lead 65 is also connected to a lead 70 which is open at the selector switch 54 at this time. Further, when the control relay coil CR is energized the second normally open control relay contact CRc is closed to interconnect lead 71 with lead 72 so as to energize the relay coil S to close contacts SA for energizing and starting up the spindle drive motor 16. Second normally closed control relay contacts CRd also are opened by energizing control relay coil CR so as to cut out and release the magnetic brake 17 for free rotation of the main drive motor 16.

When the start button 56 is pressed its second normally open contact 56b interconnects leads 73 and 74, lead 73 being connected through lead 75 to the traverse forward relay coil TF, the other end of which coil is connected through a lead 76 to the power supply lead 69. The lead 74 in turn is connected to a lead 77 which at this time is interconnected to the lead 48 through the closed contact 78 of second limit switch LS1 and through the lead 48 and contact 46 of first limit switch LS2 and the lead 47, the closed contact of the selector switch 54, to leads 55, 63, stop push button 59, and lead 58 to the other power supply lead 57 so as to close normally open forward rapid traverse power contacts TFa to energize the rapid traverse motor 27 in forward movement. This forward rapid traverse movement continues until a trip dog 79 fixed to the work table 18 engages the control arm 80 of second limit switch LS1 opening contact 78 and closing contact 81 to interconnect lead 66 with lead 82 thus de-energizing the coil TF and opening contacts TFa to de-energize the rapid traverse motor 27.

At the conclusion of the rapid traverse movement forward at the point 83 in the diagram on the work table 18 in the drawing, the operator then moves the feed control lever 40 to the forward feed position 40b so as to apply power drive from the column transmission 16 to the feed screw 19 as described. In so moving the lever from position 40a to position 40b the cam lug 44 releases the control arm 45 of the first limit switch LS2 so as to open contacts 46 and close contacts 84 interconnecting leads 82 and 66. The normal feeding movement of the work table 18 thus continues with the lever 40 in its feed forward position 40b until the point 85 in the aforementioned diagram is reached at the end of the forward feeding cycle. At this time a suitable trip dog 86 fixed on the work table 18 engages the operating pin 87 on the projecting lug 88 of the control lever 40 so as to move it back from its feed forward position 40b to its neutral position 40a stopping the feeding motion. It is important to note that so long as contacts 46 are open in the first limit switch LS2 which occurs whenever the lever 40 is moved to a feed position 40b or 40c, the rapid traverse movement is rendered inoperative so that at no time will the rapid traverse motor 27 be energized with the positive feed clutch spool in engagement for one direction or the other of feed travel. Also, the second limit switch LS1 contacts 78 when opened prevent operation of the rapid traverse movement when the feed is operating during its normal forward feeding stroke.

As described above the trip dog 52 on the table 18 normally holds the contact 49 of the third limit switch LS3 open when the table is in fully retracted position at the start of an operating cycle. However, as soon as the table begins to move forward and the trip dog 52 releases the control arm 53 of the third limit switch LS3 contacts 49 become closed and remain so during the forward and return movements of the work table 18. Thus at the end of the forward rapid traverse and feeding movements at the point 85 in the diagram contacts 49 are closed.

At the end of the forward feed stroke at the point 85 and with the feed control lever 40 again moved back to position 40a, contacts 84 of first limit switch LS2 are opened so as to disconnect lead 66 from lead 61 with the result that the control relay coil CR is de-energized opening first normally open control relay contact CRa and closing first normally closed control relay contact CRb. Closing first normally closed control relay contact CRb interconnects leads 67 with lead 50 through the closed contact 49 of third limit switch LS3 and lead 48 the contacts 46 of first limit switch LS2 to the lead 47 and then through the closed contact of the selector switch 54 to the leads 55, 63, stop push button 59, and lead 58 to the power supply lead 57 so as to energize the traverse reverse relay coil TR closing normally open reverse rapid traverse power contacts TRa to energize the traverse motor 27 for reverse operation to retract the table from the position 89 in the diagram to the starting position 90 or 43 at the beginning of the cycle just described. As the rapid traverse movement continues from position 89 to position 90, as position 90 is reached the third limit switch LS3 is again operated by the trip dog 52 to open contacts 49 and thereby de-energize the traverse reverse relay coil TR and stop the rapid traverse movement. The cycle just described may then be repeated by merely pressing the start button 56 again and the machine functioning and circuit operating as described.

At any time the entire operation of the circuit may be arrested by pressing the stop push button 59 which breaks the connection between the leads 58 and 60. The spindle motor 16 and magnetic brake 17 are respectively de-energized and energized to arrest rotation of the spindle 11 at the end of the forward feeding motion at the points 85—89 by de-energizing the control relay coil CR as described.

The machine may be operated in hand manual cycle by moving the selector switch 54 to a position to interconnect lead 61 and lead 70 whereupon pressing of the start button 56 and releasing thereof causes the control relay coil CR to remain energized so that the spindle motor 16 is driving and the magnetic brake 17 released. By thus disconnecting lead 47 from lead 55 the limit switches LS1, LS2 and LS3 are rendered inoperative and the machine may be controlled in feeding motion by manipulating the control lever 49 and in rapid traverse motion by manipulating the usual hand wheels and bell crank handles for actuating the feed screw 19 is desired. The circuit is also arranged to permit jogging of the work spindle and intermittent release of the magnetic brake 17 by pressing the jog button 91 which momentarily energizes the relay coil S while deenergizing the magnetic brake 17 when pressed to interconnect leads 71 and 72 and to disconnect leads 92 and 93 associated with the magnetic brake circuit which is energized from a transformer 94 having a primary winding 95 interconnected to leads 57 and 69 and having a secondary winding 96 connected through a suitable rectifier means 97 and control rheostat 98 to the leads 99 and 100 connected to the magnetic brake 17 in a well known manner.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed as new and desired to be obtained by United States Letters Patent is:

1. An automatic cycle control mechanism for a machine tool having, a main drive motor, a movable element, a mechanical feed drive for said movable element, means for driving said mechanical feed drive from said main drive motor, a clutch for connecting or disconnecting said main drive motor relative to said mechanical feed drive, a rapid traverse drive motor directly connected to said mechanical feed drive, a feed control lever manually operable to engage or disengage said clutch, means on said movable element for moving said feed control lever from an engaged position to disengaged position of said clutch, a source of power for operating both of said motors, a start push button, a first limit switch actuated by the movement of said feed control lever when in disengaged position of said clutch to cause said start push button to energize both said motors when pressed, a second limit switch actuated by the movement of said movable element to a predetermined forward position to cause said source of power to be disconnected from said rapid traverse drive motor, means in said first and second limit switches to maintain connection of said source of power to said main drive motor after said second limit switch has been operated to disconnect power from said rapid traverse drive motor, and means in said first limit switch operable by movement of said feed control lever to disconnected position of said mechanical clutch, after said second limit switch has been actuated to de-energize said rapid traverse drive motor, to de-energize said main drive motor and energize said rapid traverse drive motor in reverse movement to retract said movable element.

2. An automatic cycle control mechanism for a machine tool having, a main drive motor, a movable element, a mechanical feed drive for said movable element, means for driving said mechanical feed drive from said main drive motor, a clutch for connecting or disconnecting said main drive motor relative to said mechanical feed drive, a rapid traverse drive motor directly connected to said mechanical feed drive, a feed control lever manually operable to engage or disengage said clutch, means on said movable element for moving said feed control lever from an engaged position to disengaged position of said clutch, a source of power for operating both of said motors, a start push button, a first limit switch actuated by the movement of said feed control lever when in disengaged position of said clutch to cause said start push button to energize both said motors when pressed, a second limit switch actuated by the movement of said movable element to a predetermined forward position to cause said source of power to be disconnected from said rapid traverse drive motor, means in said first and second limit switches to maintain connection of said source of power to said main drive motor after said second limit switch has been operated to disconnect power from said rapid traverse drive motor, and means in said first limit switch operable by movement of said feed control lever to disconnected position of said mechanical clutch, after said second limit switch has been actuated to deenergize said rapid traverse drive motor, to de-energize said main drive motor and energize said rapid traverse drive motor in reverse movement to retract said movable element, and a third limit switch actuated by said movable element when in fully retracted position to de-energize the reverse movement of said rapid traverse drive motor.

3. An automatic cycle control mechanism for a machine tool having, a main drive motor, a movable element, a mechanical feed drive for said movable element, means for driving said mechanical feed drive from said main drive motor, a clutch for connecting or disconnecting said main drive motor relative to said mechanical feed drive, a rapid traverse drive motor directly connected to said mechanical feed drive, a feed control lever manually operable to engage or disengage said clutch, means on said movable element for moving said feed control lever from an engaged position to disengaged position of said clutch, a source of power for operating both of said motors, a first control circuit lead connected to said source of power, a second control circuit lead connected to said source of power, a normally closed stop push button interconnected between said source of power and said first lead, a start push button having a first normally open contact connected in series with a control relay coil between said first and second leads, a rapid traverse relay coil connected to actuate normally open forward power contacts connected between said source of power and said rapid traverse drive motor and a first normally open traverse forward control contact, a first normally open control relay contact actuated by said control relay coil, means connecting said first normally open traverse forward and first normally open control relay contacts in series with said first lead and a connection between said first normally open contact of said start push button and said control relay coil, a first limit switch having a normally open contact actuable to closed position by movement of said feed control lever to disengaged position for said clutch shunted across said first normally open traverse forward control contact, a second limit switch having a normally open contact actuable to closed position by movement of said movable element to a predetermined forward position shunted across said first normally open traverse forward control contact, and a selector switch having a contact movable to a hand position of direct shunt across said first normally open traverse contact and both of said normally open limit switch contacts.

4. An automatic cycle control mechanism for a machine tool having, a main drive motor, a movable element, a mechanical feed drive for said movable element, means for driving said mechanical feed drive from said main drive motor, a clutch for connecting or disconnecting said main drive motor relative to said mechanical feed drive, a rapid traverse drive motor directly connected to said mechanical feed drive, a feed control lever manually operable to engage or disengage said clutch, means on said movable element for moving said feed control lever from an engaged position to disengaged position to said clutch, a source of power for operating both of said motors, a first control circuit lead connected to said source of power, a second control circuit lead connected to said source of power, a normally closed stop push button interconnected between said source of power and said first lead, a start push button having a first normally open contact connected in series with a control relay coil between said first and second leads, a rapid traverse relay coil connected to actuate normally open forward power contacts connected between said source of power and said rapid traverse drive motor and a first normally open traverse forward control contact, a first normally open control relay contact actuated by said control relay coil, means connecting said first normally open traverse forward and first normally open control relay contacts in series with said first lead and a connection between said first normally open contact of said start push button and said control relay coil, a first limit switch having a normally open contact actuable to closed position by movement of said feed control lever to disengaged position for said clutch shunted across said first normally open traverse forward control contact, a second limit switch having a normally open contact actuable to closed position by movement of said movable element to a predetermined forward position shunted across said first normally open traverse forward control contact, and a selector switch having a contact movable to a hand position of direct shunt across said first normally open traverse contact and both of said normally open limit switch contacts, a normally closed contact in said first limit switch, a second automatic contact in said selector switch, a normally closed contact in said second limit switch actuable to open position by movement of said feed control lever to disengaged position of said clutch, a normally closed contact in said second limit switch actuable to open position by movement of said movable element to said predetermined forward position, a second normally open start push button contact, a traverse forward relay coil, means for connecting said second automatic contact of said selector switch, said normally closed contacts of said first and second limit switches, said second normally open contact of said start push button and said traverse forward relay coil in series between said first and second leads, and a second normally open control contact actuated by said traverse forward relay coil shunted across said second normally open start push button contact.

5. An automatic cycle control mechanism for a machine tool having, a main drive motor, a movable element, a mechanical feed drive for said movable element, means for driving said mechanical feed drive from said main drive motor, a clutch for connecting or disconnecting said main drive motor relative to said mechanical feed drive, a rapid traverse drive motor directly connected to said mechanical feed drive, a feed control lever manually operable to engage or disengage said clutch, means on said movable element for moving said feed control lever from an engaged position to disengaged position to said clutch, a source of power for operating both of said motors, a first control circuit lead connected to said source of power, a second control circuit lead connected to said source of power, a normally closed stop push button interconnected between said source of power and said first lead, a start push button having a first normally open contact connected in series with a control relay coil between said first and second leads, a rapid traverse relay coil connected to actuate normally open forward power contacts connected between said source of power and said rapid traverse drive motor and a first normally open traverse forward control contact, a first normally open control relay contact actuated by said control relay coil, means connecting said first normally open traverse forward and first normally open control relay contacts in series with said first lead and a connection between said first normally open contact of said start push button and said control relay coil, a first limit switch having a normally open contact actuable to closed position by movement of said feed control lever to disengaged position for said clutch shunted across said first normally open traverse forward control contact, a second limit switch having a normally open contact actuable to closed position by movement of said movable element to a predetermined forward position shunted across said first normally open traverse forward control contact, and a selector switch having a contact movable to a hand position of direct shunt across said first normally open traverse contact and both of said normally open limit switch contacts, a normally closed contact in said first limit switch, a second automatic contact in said selector switch, a normally closed contact in said second limit switch actuable to open position by movement of said feed control lever to disengaged position of said clutch, a normally closed contact in said second limit switch actuable to open position by movement of said movable element to said predetermined forward position, a second normally open start push button contact, a traverse forward relay coil, means for connecting said second automatic contact of said selector switch, said normally closed contacts of said first and second limit switches, said second normally open contact of said start push button and said traverse forward relay coil in series between said first and second leads, and a second normally open control contact actuated by said traverse forward relay coil shunted across said second normally open start push button contact, a third limit switch having a normally closed contact held in open position by the movement of said movable member to fully retracted starting position, a first normally closed contact actuated by said control relay coil, a traverse reverse relay coil, normally open reverse power contacts connected between said source of power and said rapid traverse drive motor actuated by said traverse reverse relay coil, means for connecting said third limit switch contact, said first normally closed contact of said control relay coil, and said traverse reverse relay coil in series between said second lead and a connection between said normally closed contacts of said first and second limit switches.

6. An automatic cycle control mechanism for a machine tool having, a main drive motor, a movable element, a mechanical feed drive for said movable element, means for driving said mechanical feed drive from said main drive motor, a clutch for connecting or disconnecting said main drive motor relative to said mechanical feed drive, a rapid traverse drive motor directly connected to said mechanical feed drive, a feed control lever manually operable to engage or disengage said clutch, means on said movable element for moving said feed control lever from an engaged position to disengaged position to said clutch, a source of power for operating both of said motors, a first control circuit lead connected to said source of power, a second control circuit lead connected to said source of power, a normally closed stop push button interconnected between said source of power and said first lead, a start push button having a first normally open contact connected in series with a control relay coil between said first and second leads, a rapid traverse relay coil connected to actuate normally open forward power contacts connected between said source of power and said rapid traverse drive motor and a first normally open traverse forward control contact, a first normally open control relay contact actuated by said control relay coil, means connecting said first normally open traverse forward and first normally open control relay contacts in series with said first lead and a connection between said first normally open contact of said start push button and said control relay coil, a first limit switch having a normally open contact actuable to closed position by movement of said feed control lever to disengaged position for said clutch shunted across said first normally open traverse forward control contact, a second limit switch having a normally open contact actuable to closed position by movement of said movable element to a predetermined forward position shunted across said first normally open traverse forward control contact, and a selector switch having a contact movable to a hand position of direct shunt across said first normally open traverse contact and both of said normally open limit switch contacts, a normally closed contact in said first limit switch, a second automatic contact in said selector switch, a normally closed contact in said second limit switch actuable to open position by movement of said feed control lever to disengaged position of said clutch, a normally closed contact in said second limit switch actuable to open position by movement of said movable element to said predetermined forward position, a second normally open start push button contact, a traverse forward relay coil, means for connecting said second automatic contact of said selector switch, said normally closed contacts of said first and second limit switches, said second normally open contact of said start push button and said traverse forward relay coil in series between said first and second leads, and a second normally open control contact actuated by said traverse forward relay coil shunted across said second normally open start push button contact, a third limit switch having a normally closed contact held in open position by the movement of said movable member to fully retracted starting position, a first normally closed contact actuated by said control relay coil, a traverse reverse relay coil, normally open reverse power contacts connected between said source of power and said rapid traverse drive motor actuated by said traverse reverse relay coil, means for connecting said third limit switch contact, said first normally closed contact of said control relay coil, said traverse reverse relay coil in series between said second lead and a connection between said normally closed contacts of said first and second limit switches, a second normally open contact actuated by said control relay coil, a main drive spindle motor relay coil, power contacts actuable by said main drive spindle motor relay coil connected between said source of power and said spindle motor, and means for connecting said second normally open contact of said control relay coil and said main drive spindle motor relay coil in series between said first and second leads.

7. An automatic cycle control mechanism for a machine tool having, a main drive motor, a movable element, a mechanical feed drive for said movable element, means for driving said mechanical feed drive from said main drive motor, a clutch for connecting or disconnecting said main drive motor relative to said mechanical feed drive, a rapid traverse drive motor directly connected to said mechanical feed drive, a feed control lever manually operable to engage or disengage said clutch, means on said movable element for moving said feed control lever from an engaged position to disengaged position to said clutch, a source of power for operating both of said motors, a first control circuit lead connected to said source of power, a second control circuit lead connected to said source of power, a normally closed stop push button interconnected between said source of power and said first lead, a start push button having a first normally open contact connected in series with a control relay coil between said first and second leads, a rapid traverse relay coil connected to actuate normally open forward power contacts connected between said source of power and said rapid traverse drive motor and a first normally open traverse forward control contact, a first normally open control relay contact actuated by said control relay coil, means connecting said first normally open traverse forward and first normally open control relay contacts in series with said first lead and a connection between said first normally open contact of said start push button and said control relay coil, a first limit switch having a normally open contact actuable to closed position by movement of said feed control lever to disengaged position for said clutch shunted across said first normally open traverse forward control contact, a second limit switch having a normally open contact actuable to closed position by movement of said movable element to a predetermined forward position shunted across said first normally open traverse forward control contact, and a selector switch having a contact movable to a hand position of direct shunt across said first normally open traverse contact and both of said normally open limit switch contacts, a normally closed contact in said first limit switch, a second automatic contact in said selector switch, a normally closed contact in said second limit switch actuable to open position by movement of said feed control lever to disengaged position of said clutch, a normally closed contact in said second limit switch actuable to open position by movement of said movable element to said predetermined forward position, a second normally open start push button contact, a traverse forward relay coil, means for connecting said second automatic contact of said selector switch, said normally closed contacts of said first and second limit switches, said second normally open contact of said start push button and said traverse forward relay coil in series between said first and second leads, and a second normally open control contact actuated by said traverse forward relay coil shunted across said second normally open start push button contact, a third limit switch having a normally closed contact held in open position by the movement of said movable member to fully retracted starting position, a first normally closed contact actuated by said control relay coil, a traverse reverse relay coil, normally open reverse power contacts connected between said source of power and said rapid traverse drive motor actuated by said traverse reverse relay coil, means for connecting said third limit switch contact, said first normally closed contact of said control relay coil, said traverse reverse relay coil in series between said second lead and a connection between said normally closed contacts of said first and second limit switches, a second normally open contact actuated by said control relay coil, a main drive spindle motor relay coil, power contacts actuable by said main drive spindle motor relay coil connected between said source of power and said spindle motor, and means for connecting said second normally open contact of said control relay coil and said main drive spindle motor relay coil in series between said first and second leads, a jog push button having a normally open contact shunted across said second normally open contact of said control relay coil.

HARRY C. KEMPER.
NELSON D. COOPER.

References Cited in the file of this patent
UNITED STATES PATENTS

| Number | Name | Date |
|---|---|---|
| 2,259,424 | Koch | Oct. 14, 1941 |
| 2,319,258 | Penrose | May 18, 1943 |
| 2,358,746 | Tandler et al. | Sept. 19, 1944 |
| 2,362,318 | Staples | Nov. 7, 1944 |
| 2,421,187 | Derungs | May 27, 1947 |
| 2,498,272 | Herchenroeder | Feb. 21, 1950 |
| 2,558,275 | Siekmann et al. | June 26, 1951 |